Oct. 1, 1929.                    P. THOMAS                    1,730,341
SYNCHRONIZING RELAY SYSTEM
Filed Aug. 25, 1927          2 Sheets-Sheet 1

INVENTOR
Phillips Thomas
BY
ATTORNEY

Oct. 1, 1929.                    P. THOMAS                    1,730,341
                         SYNCHRONIZING RELAY SYSTEM
                         Filed Aug. 25, 1927        2 Sheets-Sheet 2
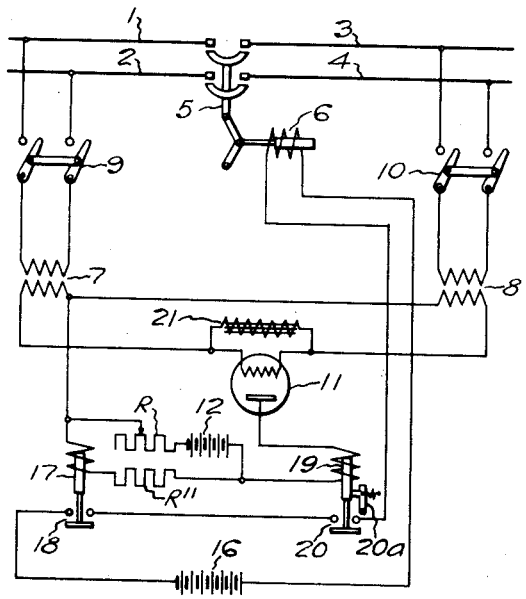
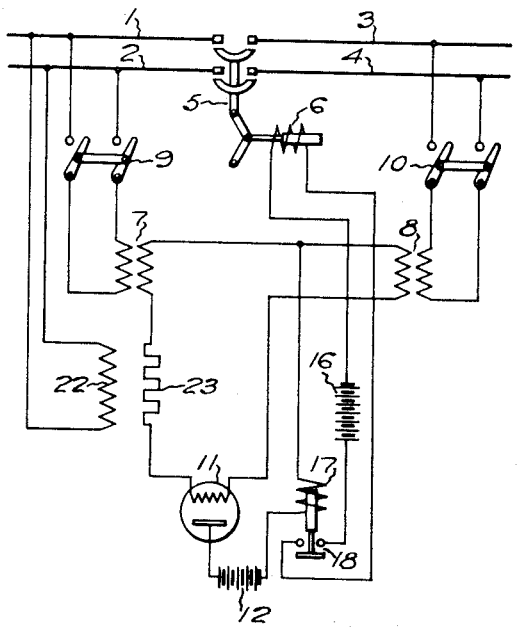
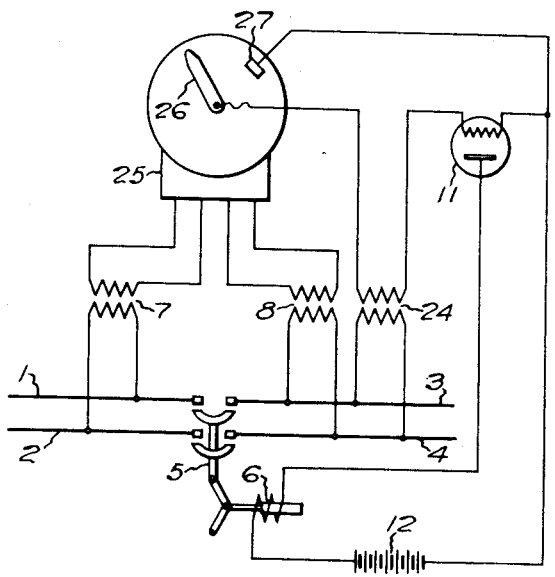
INVENTOR
*Phillips Thomas*
BY
ATTORNEY Patented Oct. 1, 1929

1,730,341

UNITED STATES PATENT OFFICE

PHILLIPS THOMAS, OF EDGEWOOD, PENNSYLVANIA, ASSIGNOR TO WESTINGHOUSE ELECTRIC & MANUFACTURING COMPANY, A CORPORATION OF PENNSYLVANIA

SYNCHRONIZING RELAY SYSTEM

Application filed August 25, 1927. Serial No. 215,377.

This invention pertains to automatic synchronizers in which, upon the occurrence of exact synchronism between two alternating current sources, a switch connecting the said sources is closed.

In automatic synchronizers of the prior art, the disadvantages have been the high cost due to the extreme accuracy necessary in manufacture, and the unreliability due to the wear and friction of the moving parts.

One object of this invention is to provide a simple, reliable and inexpensive paralleling relay system having a long life and being without moving parts.

Another object is to provide a relay which will not respond to cause paralleling as long as the sources to be paralleled are out of synchronism.

A further object is to arrange the circuit of the paralleling relay so that it may be made more sensitive to the phase difference between the voltages of the sources to be paralleled if the voltages are substantially equal, and conversely, to cause the paralleling relay to be less critical of phase conditions if the voltages of the sources are unequal, thereby compensating for voltage variations.

A further object is to provide a relay which may be adjusted so that paralleling may be accomplished when the voltages of the alternating-current sources are within a predetermined angle of phase difference.

A still further object is to utilize the thermal lag and critical conductance of a thermionic relay as a detector of synchronous conditions, and as a means for controlling the paralleling operation.

To accomplish these objects, I provide a relay responsive to the thermal effect of the current produced by the resultant of the voltages of the systems to be paralleled. This relay, when synchronism occurs, operates to energize either the closing coil of a paralleling switch or the coil of a second relay which in turn closes a circuit to the coil of the paralleling switch.

The thermally responsive relay may be any one of a number of types having such an operating characteristic that the response of the relay is delayed for a finite time after its energization, after which the relay is critically responsive to applied voltage.

The system of my invention will be better understood by reference to the accompanying drawings, in which equivalent elements of the various figures are referred to by identical numerals and in which;

Figs. 2, 5, 6, 7 and 8 are modifications, and

Figure 1:
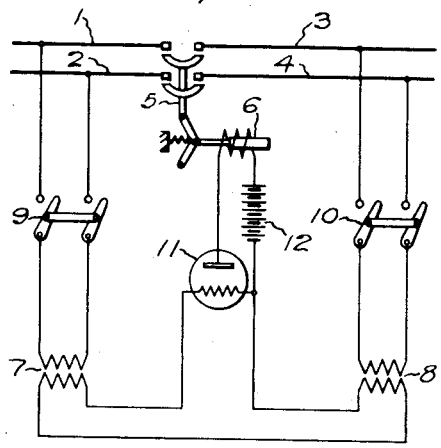
Figure 1 is an embodiment of the broad idea underlying the invention.
Figure 2:
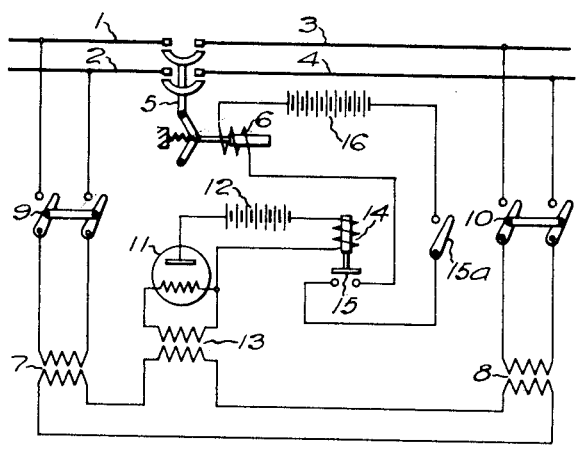

In Fig. 1, 1—2 represents an alternating current source which may be a transmission line, bus or generator. A similar source is represented at 3—4. A switch 5 is arranged to connect these sources in parallel under suitable conditions. The switch 5 is operated by the solenoid 6. To the sources 1—2 and 3—4 are connected the primaries of transformers 7 and 8 through switches 9 and 10, respectively. The secondaries of transformers 7 and 8 are connected in series with the filament of a termionic relay 11. Although I have illustrated a thermionic relay as a specific example, as before stated, any relay having a delayed response and a subsequent sensitiveness to applied voltage may be employed instead. Connections are so made that the voltages of the two alternating current sources are normally cumulative in the local circuit including the filament of the relay 11, i. e., the voltage across the filament is the vector sum of the transformer voltage, when the sources are in phase. A battery 12 furnishes the voltage necessary to cause the flow of current through the relay 11.

In the operation of this system, switches 9 and 10 are first closed, either manually or automatically, with the result that in the local circuit, including the filament of the thermionic relay 11, there is set up a current proportional to the vector sum of the voltages in the alternating current sources. This current has a frequency equal to the difference in the frequencies of the sources. This frequency difference or beat frequency decreases as the sources are brought into synchronism.

It is a known characteristic of a thermionic device such as that shown at 11 that there is a time lag between the application of voltage to the filament and the heating thereof to such a degree that plate current is initiated. This lag is due to the thermal inertia or heat capacity of the filament and is made use of to determine when the sources have been synchronized long enough to make paralleling feasible. It is unsafe, obviously, to parallel alternating-current circuits on momentary synchronism, and the substantial coincidence of the voltage waves of the sources will persist for an appreciable time if the sources are comparatively close to the same frequency, so that the filament of the relay 11 will be heated to its operating temperature.

The constants of the local circuit are so designed or adjusted that current will flow through the relay 11 only when the vector sum of the voltages of the transformers 7 and 8 is of a predetermined magnitude, and the vector sum of these voltages will be of this magnitude when they are in exact synchronism. When this occurs, the sources are in condition to be paralleled and at that time the plate current of the thermionic relay 11 is initiated and passes through the closing coil 6 of the switch 5, causing the switch to be closed and the alternating current circuits to be paralleled.

Figure 3:
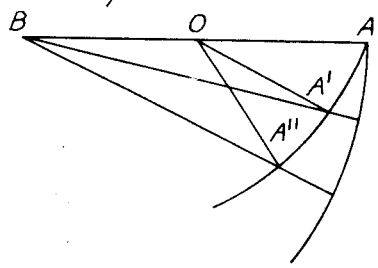
Figs. 3 and 4 are vector diagrams representing conditions under which paralleling will take place in the modifications of Figs. 1 and 2.

The operation of this system may be further made clear by reference to Fig. 3, in which OB represents the voltage of one source such as 1—2, and OA represents the voltage of the other source 3—4. Let it be assumed that lines 1—2 are connected to the incoming generator and that lines 3—4 are connected to a transmission line. In this case, generally speaking, generator voltage OB will be constant and line voltage OA may be variable, whereas the frequency of the generator voltage OB may be varied and the frequency of the line voltage OA is substantially constant. The voltage required to initiate the flow of plate current in the thermionic relay 11 is proportional to the vector sum of the voltages OB and OA, or BA.

Assuming that the line voltage OA momentarily has the position OA', with respect to generator voltage OB, the vector sum of BO and OA' will be less than BA which is required to operate the relay 11, and therefore paralleling will not occur when the voltages are in such phase position. With the line voltage at the value OA, the relay will not be fully energized except when synchronism, i. e., exact phase opposition, is obtained.

In Fig. 2, I have shown a relay system similar to that of Fig. 1, except that in Fig. 2, paralleling takes place upon the extinction of the plate current instead of upon its initiation. In Fig. 2 the output of transformers 7 and 8 is supplied to a third transformer 13, the secondary of which is connected to the filament of the thermionic relay 11. Connections to the transformers 7 and 8 from the line 1—2 and line 3—4, are such that the voltage impressed on the primary of the transformer 13, is the vector difference of the voltages existing in the secondaries of the transformers 7 and 8. Switch 15a is provided to keep the paralleling switch 5 from closing when the entire relay system is deenergized.

In the operation of the system disclosed in Fig. 2, switches 9 and 10 are closed, manually or automatically, and assuming sources 1—2 and 3—4 to be out of synchronism, the voltage due to the vector difference of the voltages existing in the secondaries of transformers 7 and 8 will cause the filament of the thermionic valve to be heated, and battery 12 will cause plate current to flow through the local circuit, including the coil of a relay 14, which will open the switch 15. The switch 15a may now be closed and the speed of the generator connected to lines 1—2 may be varied to bring the voltages into synchronism. As synchronism is approached, the vector difference of the voltages of the two source decreases, assuming that the voltages of the sources have been made substantially equal. As the filament current decreases due to decreasing voltage, a point is reached at which the plate current is extinguished. The extinction of the plate current may be made to occur at a time when the voltage vectors are in the proper position for the sources to be paralleled. When the plate current is extinguished, relay 14 drops out, closing switch 15, completing a circuit through the battery 16 and the closing coil 6 of the paralleling switch 5. As a result, the switch 5 will be closed and the two sources will be properly paralleled.

Figure 4:
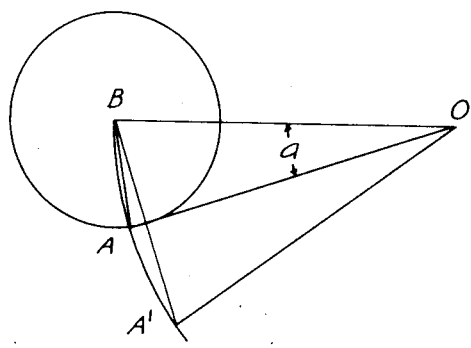

The diagram of Fig. 4 explains graphically the operation of the system of Fig. 2. In Fig. 4, AB is the minimum voltage at which the plate current will continue to flow. OB and OA are the machine and the line voltages as in Fig. 3. The vector difference of the two will be less than BA only when the phase angle between the voltages of the sources is less than angle "a", and, therefore, paralleling will be effected only when the two voltages are separated by a phase angle less than angle "a".

Figure 5:
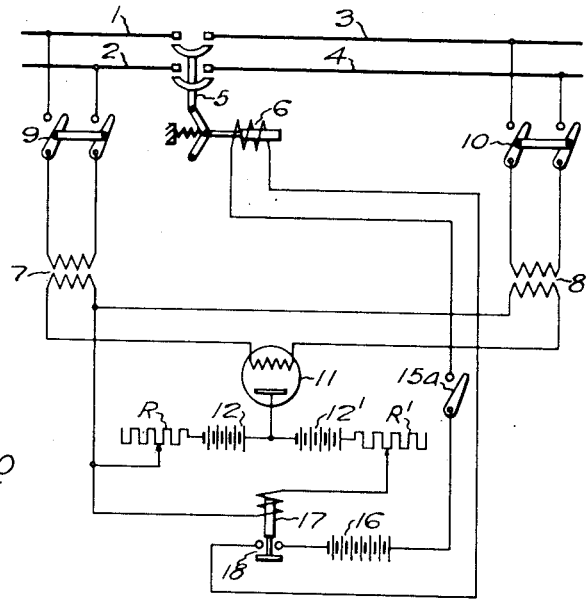

It has been observed that in the system of Fig. 2, the adjustment of the relay 14 depends somewhat on the voltage in the plate circuit. To obviate the effect of this variation, and to make possible the adjustment of the point at which paralleling is effected, I provide a plate battery and in addition, a separate relay battery as shown at 12' in Fig. 5. In this figure, the transformers 7 and 8 are connected through switches 9 and 10 to lines 1—2 and 3—4, as in Fig. 2. In series with the plate battery 12 is the rheostat R. Connected also to the plate is the relay battery 12', in series with which are connected rheostat R' and the operating coil of relay 17. The provision of the batteries 12 and 12' with their respective rheostats R and R' makes possible the adjustment of the local circuit to the relay constants, so that the relay responds at the proper time. The switch 15a is employed as in the circuit of Fig. 2 to prevent closure of switch 5 until after the voltages of the sources have been synchronized as indicated by cessation of the flow of plate current.

It will be seen that when the filament of the relay 11 is heated, the relay will provide a low resistance path for current from the battery 12. The battery 12' will not supply any plate current, since its negative pole is connected to the plate of the relay which conducts current only from the plate to the filament and not in the reverse direction. Assuming that switches 9 and 10 are closed, and that the voltages of the two systems are out of synchronism, a voltage proportional to the vector difference of the voltages of the sources will cause current to flow through the filament of the relay 11. Switch 15a should then be closed. As long as the voltage impressed on the filament is above a predetermined value, dependent upon the constants of the relay employed, and the adjustments of the circuit, plate current will flow through the tube. As the voltages of the sources approach synchronism, the filament current decreases since the vector difference of the line and machine voltages decreases and when the voltages are within a certain phase angle, the voltage across the filament will be insufficient to heat the filament to its ionizing temperature. The plate current consequently will be extinguished and the low resistance path through the relay 11 for the current supplied by battery 12 will be interrupted. Batteries 12 and 12' then cooperate to send sufficient current through the operating coil of the relay 17 to effect the closure of the switch 18, completing a circuit through the battery 16 and the closing coil 6 of the paralleling switch 5.

In this system, use is made of the inverse current-voltage characteristic of the relay 11. In such a relay the voltage drop across the electrodes increases as the current through the device decreases. As long as current flows through the relay 11, there will be no tendency for current to flow from battery 12 through the operating coil of relay 17, but as the plate current decreases and is finally extinguished, the voltage drop across the relay increases and consequently causes the operation of the relay 17 due to the increased voltage applied thereto. The electromotive forces of the batteries 12 and 12' are so arranged and the resistance R and R' are so adjusted, that when the plate current has been extinguished the full voltage of batteries 12 and 12' will be effective in energizing the coil of relay 17. When the plate current is flowing, however, the coil of relay 17 is, in effect, short-circuited by the low resistance path across the relay 11 and the relay 17 therefore will not operate as long as the plate current flows.

In Fig. 6 I show a still further modification of the relay system of my invention. In this figure transformers 7 and 8 are so connected to the lines 1—2 and 3—4 as to impress upon the filament of the relay 11 the vector difference of the voltages of the sources. Across the terminals of the filament of the tube 11 is connected a reactor 21, designed to be saturated at a low voltage, the object of which is to provide a by-pass for the current when the voltages of the sources are in opposition. In such a case, the vector sum of the voltages of transformers 7 and 8 would be effective in heating the filament unless the reactor 21 was provided to absorb this energy. The plate circuit of this modification includes the operating coil of the relay 19 which is designed when energized by the plate current to close its switch 20, which is then latched in the closed position by a spring latch 20a. As in the previously described system, as the voltages of the sources to be paralleled are brought more nearly into synchronism by the adjustment of the phase position of one of them, the plate current decreases due to the decrease in the resultant of the voltages of transformers 7 and 8, and finally is extinguished, whereupon the voltage drop across the relay 11 increases to such an extent that the battery 12 sends current through the coil of relay 17 and the regulating resistance R''. This, of course, causes the operation of relay 17 to close the circuit including the battery 16 and the operating coil of switch 5. Here again, the relay 11, when passing current, short circuits the coil or relay 17, to prevent paralleling as long as plate current flows.

Since the relay 17 is energized at all times except when the tube 11 is passing current, the relay 19 is provided as an interlock to make sure that the synchronizing switch will not be closed except when plate current has been flowing. Switch 20a should, of course, be unlatched before switches 9 and 10 are closed, to prevent premature paralleling.

In the relay system shown in Fig. 7, I make provision for compensating for variations in the voltage of one of the sources to be paralleled. When paralleling a generator with a line, the voltage of which is below normal, it is desirable that paralleling be accomplished as quickly as possible so that the incoming generator may boost the line voltage. For this reason, it may be necessary to parallel the two sources when they are not exactly synchronized. It becomes advantageous, therefore, to cause paralleling to take place at a phase angle dependent upon the drop in line voltage below normal. This is accomplished by the arrangement shown in Fig. 7, which is similar to the previous modifications, except that in the local circuit including the filament of the relay 11, there is inserted a resistor 23 having high temperature coefficient of resistance. This resistor 23 is arranged to be heated by a heater 22 that is connected across the line 1—2. Relay 17 is provided to complete the circuit of the closing coil 6 of the switch 5 when plate current of proper value is established. Transformers 7 and 8 are so connected that the vector sum of their voltages is impressed on the resistor 23 and the filament of the relay 11. When the vector sum of the transformer voltages reaches a certain value, the filament will be sufficiently heated to permit current to flow from the plate to the filament due to the voltage of the battery 12, and simultaneously to operate the relay 17 to close the switch 18 and energize closing coil 6. Assuming that circuit 1—2 is a transmission line on which the voltage varies and circuit 3—4 is an incoming generator of which the voltage is constant, it will be seen that as the line voltage increases, the resistor 23 will be heated by the heater 22, and that, consequently, the resistance of the local circuit including the filament of the relay 11 will be increased, and therefore a greater voltage will be required to heat the filament sufficiently to operate relay 17 by the flow of plate current. This in turn necessitates that the voltages of the machine and the line be brought more nearly into synchronism, to make the vector sum of the transformer voltages sufficient to heat the filament to the ionizing temperature. The net result is, therefore, that as the line voltage increases, a closer approximation to exact synchronism between line and machine voltages will be required for paralleling, or conversely, that as the line voltage decreases, paralleling will occur at wider and wider phase differences.

Obviously, if both sections to be connected are subject to voltage variations, similar compensation may be provided for both circuits.

In Fig. 8, there is shown still another modification of my invention. In this arrangement use is made of the fact that plate current in the relay 11 will be initiated only at a definite time after the filament current has begun to flow. This thermal lag of the filament is utilized as in the previously described systems, to determine when the two alternating current sources have been in synchronism long enough to make paralleling advisable.

At 25 is indicated a synchroscope of the usual type having a pointer 26 and a contact segment 27. Contact 27 should be made adjustable both as to length and position. The synchroscope is connected to the secondaries of the transformers 7 and 8 in the usual manner to give an indication of the comparative frequencies of the two sources. Assuming that the two sources are not in synchronism, the synchroscope pointer 26 will rotate in one direction or the other at a speed determined by the difference between the frequencies of the two sources. The filament of the tube 11 is connected in series with the transformer 24, pointer 26 and contact 27, so that as the pointer 26 moves over the contact 27, the filament will be energized for a period determined by the speed of the pointer, or in other words, by the difference in the frequencies of the two sources. If the frequencies of the two sources are sufficiently close together, and the speed of the pointer sufficiently slow, the filament will be energized for an interval sufficient to initiate a flow of plate current and cause the closing of the paralleling switch 5 by the energization of the closing coil 6. If the frequencies of the two sources differ by more than a given number of cycles, the pointer 26 will pass the contact 27 in such a short time that the filament 11 will not have time to reach its maxmium temperature before the filament circuit is opened. Consequently, no plate current will flow and the paralleling switch will not be operated.

By varying the length of contact segment 27, the permissible difference in frequencies of the sources at which paralleling takes place may be varied. Similarly, by varying the position of contact 27 in the arc described by the pointer tip, the relative positions of the voltage vectors at paralleling may be altered.

While I have illustrated but one embodiment of my invention, it will be apparent to those skilled in the art that various changes, modifications, substitutions, additions and omissions may be made in the apparatus illustrated without departing from the spirit and scope of my invention, as set forth in the appended claims, and I wish it to be distinctly understood that although I have shown a thermionic relay as typical of the class of relays that may be employed in my synchronizing systems, any relay having the desired characteristic as to time lag and voltage sensitivity may be substituted for the thermionic relay shown and described.

I claim as my invention:

1. In a system for paralleling alternating-current circuits, a thermionic relay energized from said circuits, a magnetically operated switch controlled by said relay for connecting the said circuits, said relay being responsive to phase coincidence of the voltages of said circuits, and means including a variable resistor connected to said relay and means for varying said resistor in accordance with the voltage of one of said circuits to cause the said relay to be less critically responsive to phase differences if there is an appreciable difference in the voltages of the circuits.

2. In a device for paralleling alternating-current circuits, a thermionic relay, a paralleling switch for connecting said circuits, controlled by a thermionic relay, said relay being responsive to voltage and phase conditions in said circuits, and means including a resistor and voltage-responsive means for adjusting said resistor for causing the relay to be more critically responsive to phase conditions if the voltages of the circuits are nearly equal.

3. In a system for paralleling alternating-current circuits comprising a thermionic relay, a paralleling switch for connecting said circuits, controlled by said relay, said relay being responsive to phase and voltage conditions in said circuits, and means including a variable resistor for controlling the effectiveness of the voltage of one of said circuits on said relay, for varying the responsiveness of said relay to phase conditions inversely as the difference in the voltages of the circuits.

4. In a system for paralleling alternating-current circuits, a thermionic relay responsive to phase and voltage conditions of the circuits for controlling the connection thereof, a resistor in series with said relay, the resistance of the resistor being variable in accordance with the voltage of one of said circuits, whereby the responsiveness of said relay to phase conditions is made proportional to the voltage of said last-mentioned circuit.

In testimony whereof, I have hereunto subscribed my name this 15th day of August, 1927.

PHILLIPS THOMAS.